(12) United States Patent
Dudding et al.

(10) Patent No.: US 6,406,008 B1
(45) Date of Patent: Jun. 18, 2002

(54) AXLE CLAMP ATTACHMENT SYSTEM

(75) Inventors: Ashley T. Dudding, Plainfield; Lawrence Miller, Naperville, both of IL (US)

(73) Assignee: The Boler Company, Itasca, IL (US)

( * ) Notice: Subject to any disclaimer, the term of this patent is extended or adjusted under 35 U.S.C. 154(b) by 0 days.

(21) Appl. No.: 09/551,901

(22) Filed: Apr. 19, 2000

(51) Int. Cl.$^7$ .............................................. B60G 11/34
(52) U.S. Cl. ......................... 267/52; 267/53; 267/229; 280/124.17; 280/124.175; 248/228.1
(58) Field of Search .............. 267/52, 53; 280/127.175, 280/124.17; 403/373, 374.1, 374.2, 374.3, 374.4, 374.5; 248/228.1, 228.2, 228.5

(56) References Cited

U.S. PATENT DOCUMENTS

| | | | | |
|---|---|---|---|---|
| 2,072,198 A | * | 3/1937 | Davis | 301/124 |
| 3,437,333 A | * | 4/1969 | Koch et al. | 267/52 |
| 3,494,609 A | * | 2/1970 | Harbes, Jr. | 267/52 |
| 5,328,159 A | * | 7/1994 | Kauffaman et al. | 267/52 |
| 5,476,251 A | * | 12/1995 | Moses et al. | 267/52 |
| 5,881,606 A | * | 3/1999 | Roddy | 74/551.1 |

FOREIGN PATENT DOCUMENTS

| | | | | |
|---|---|---|---|---|
| GB | 2186316 A | * | 8/1987 | |
| JP | 672351 A | * | 3/1994 | |

* cited by examiner

*Primary Examiner*—Christopher P. Schwartz
*Assistant Examiner*—Melody M. Burch
(74) *Attorney, Agent, or Firm*—Cook, Alex, McFarron, Manzo, Cummings & Mehler, Ltd.

(57) ABSTRACT

The invention relates to suspensions for trucks and trailers and to systems for clamping an axle housing to a combination suspension support member and spring in such a way that the axle housing is clamped and compressed uniformly on all four sides whereby there is no appreciable tendency for the axle housing to collapse or become deformed so as to require frequent retorquing of the clamping bolts. The system uses interfitting bottom and top axle housing wraps. The bottom axle wrap has upwardly extending sides engaging opposite sides of the axle housing either directly or against interfitting downward extensions on the top axle housing wrap. Vertical clamping bolts cause the upwardly extending sides on the bottom wrap to press inwardly against the sides of the axle housing.

6 Claims, 3 Drawing Sheets

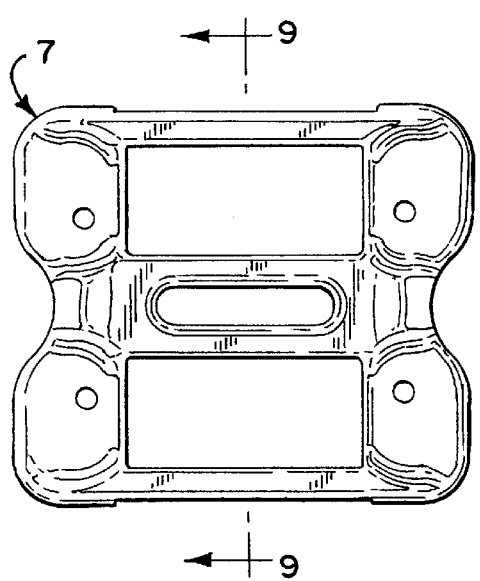
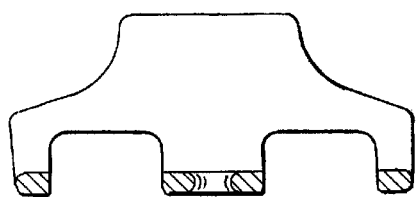
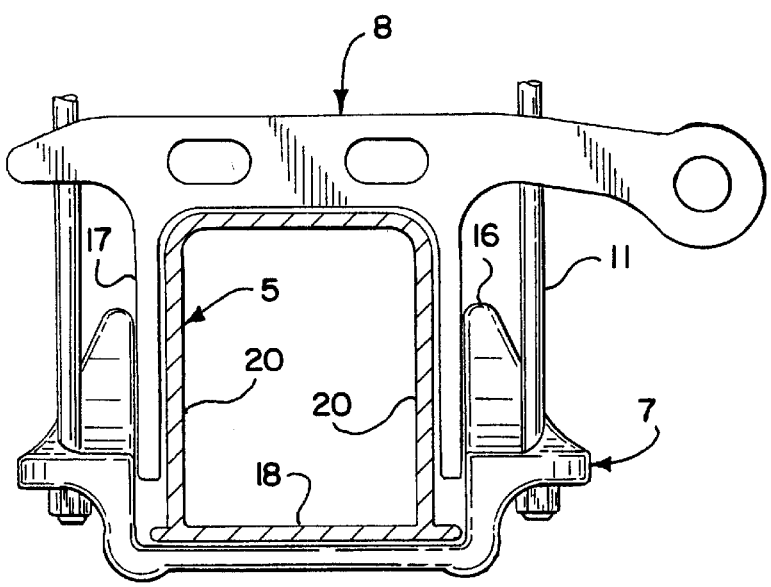
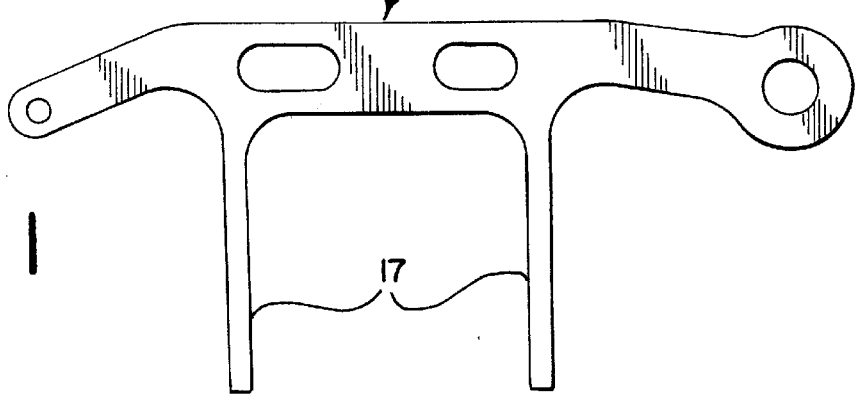

AXLE CLAMP ATTACHMENT SYSTEM

BRIEF DESCRIPTION OF THE INVENTION

Field of the Invention

The present invention relates generally to suspensions for trucks and trailers and in particular to innovations and improvements in the system for clamping an axle housing to a combination suspension support member and spring in such a way that the axle housing is clamped and compressed uniformly on all four sides whereby there is no appreciable tendency for the axle housing to collapse or become deformed so as to require frequent re-torquing of the clamping bolts.

BACKGROUND OF THE INVENTION

In truck and trailer suspensions the opposite ends of the axle housings must be securely clamped to a support such as a combination suspension support and spring. Heretofore, various clamping systems have been used, usually resulting in compressive forces being applied to the top and bottom of an axle housing with the clamp bolt load being very high, typically in the range of 30,000 to 50,000 pounds per bolt. Usually four bolts are used together at each clamping site making the total load there in the range of 120,000 to 200,000 pounds. Clamp bolt loads in this range generate a very high bending load on the bottom plate which engages the underside of an axle housing thereby requiring the plate to be very thick and heavy in order to sustain the load to which it is subjected. The thickness takes up ground clearance and the bending load produces a "spring" effect causing flexing of the bottom plate, making it very difficult to obtain a secure clamping joint. Further, there has been no convenient method to positively locate the bottom plate relative to the axle housing. This results in the bolts not being perpendicular to the axle housing which, in turn, detracts from the security of the joint.

With the clamping forces in prior clamping systems being essentially confined to the bottom and top plates, there was a tendency for the sidewalls of the axle housing to deform or collapse allowing the clamping bolts to loosen whereupon the bolts had to be re-tightened or re-torqued after relatively short periods of service.

BRIEF SUMMARY OF THE INVENTION

According to the present invention novel bottom axle housing wraps and top axle housing wraps are provided which act to apply the clamping forces substantially uniformly to all four sides of an axle housing thereby eliminating any appreciable tendency for the axle housing to be deformed or for the clamping joint to become loose.

The invention involves the use of novel bottom and top axle housing wraps. The bottom axle housing wraps have upwardly extending fingers or sides the inner surfaces of which bear against the opposite sides of the axle housing either directly or against interfitting downward extensions on the top axle housing wrap. The vertical clamping bolts extend between the top and bottom axle housing wraps and clamping plate on a leaf spring or other support with the bolts being spaced from the sides of the axle housing so as to allow the fingers or upwardly extending sides on the bottom wrap to press inwardly against the sides of the axle housing.

In a preferred embodiment, the top axle housing wrap has depending or downwardly extending sides which engage the sidewalls of the axle housing and telescope into the upwardly extending sides or fingers on the bottom axle housing wrap.

For a more complete understanding of the nature and scope of the invention reference may be had to the following detailed description of a presently preferred embodiment taken in connection with the accompanying drawings, wherein:

BRIEF DESCRIPTION OF THE DRAWINGS

FIG. 8 is a plan view of the bottom side of the bottom axle housing wrap of FIG. 3;

FIG. 9 is a sectional view taken on line 9—9 of FIG. 8;

FIG. 10 is an end elevational view taken on line 10—10 of FIG. 2; and

FIG. 11 is a side elevational view of the top axle wrap of FIGS. 1 and 2.

DESCRIPTION OF THE INVENTION

Figure 1:
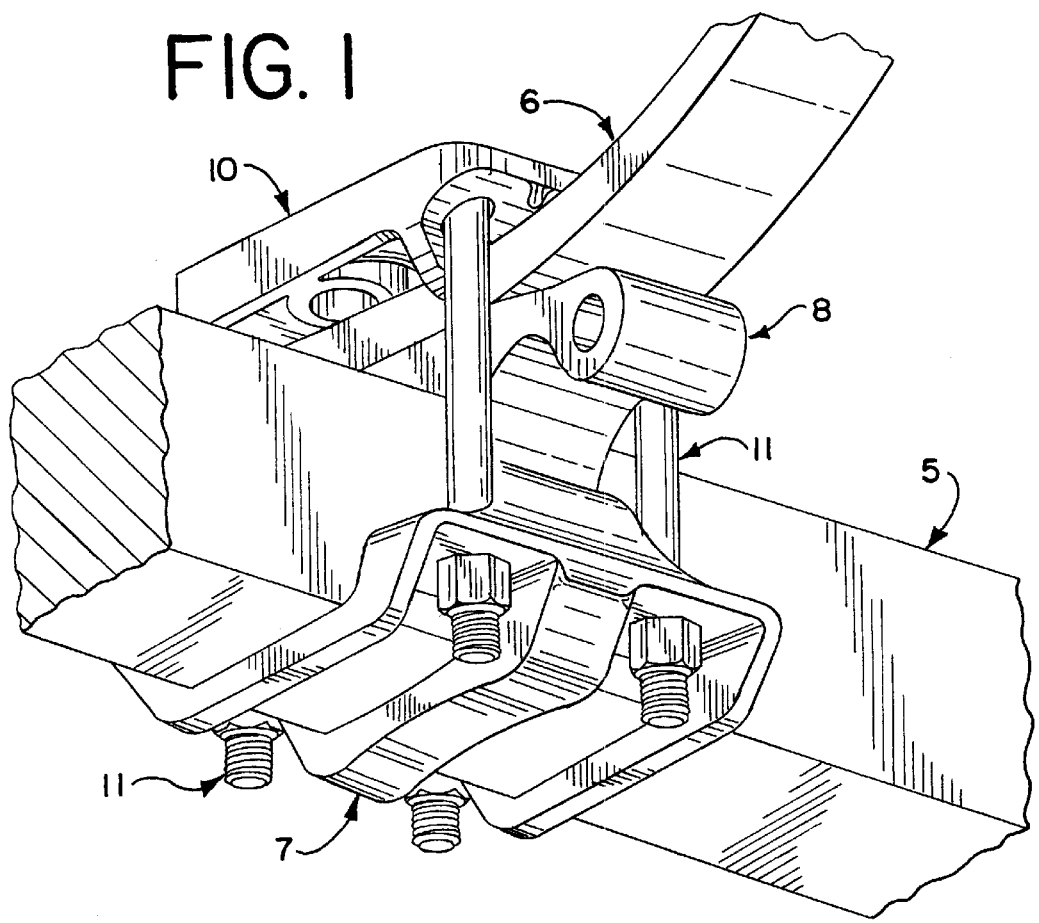
FIG. 1 is a fragmentary perspective view of a system for clamping an end of an axle housing to a combination support member and spring in accordance with the present invention.
Figure 2:
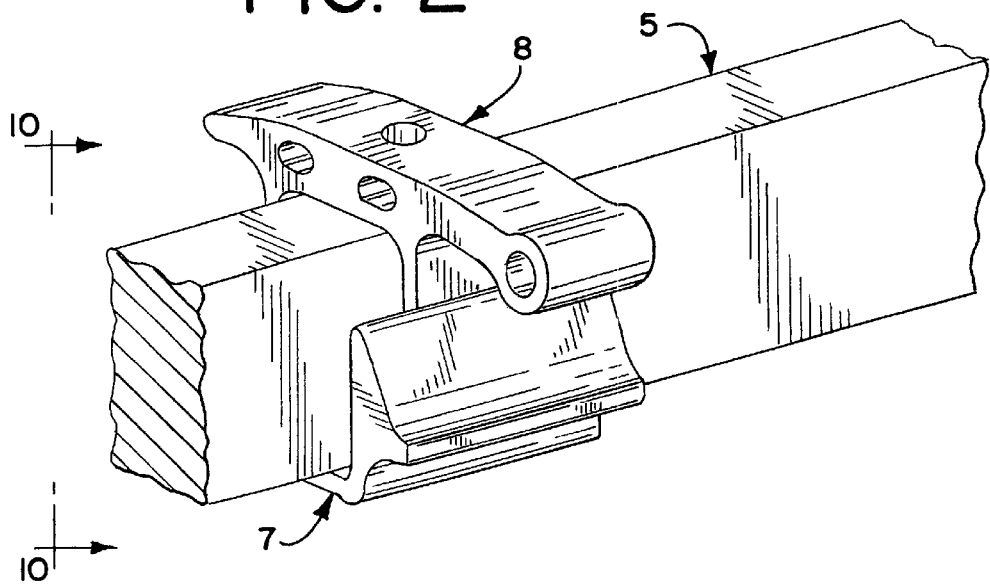
FIG. 2 is a fragmentary perspective view showing the bottom axle housing wrap and top axle housing wrap of FIG. 1 in interfitting relationship on an axle housing.
Figure 3:
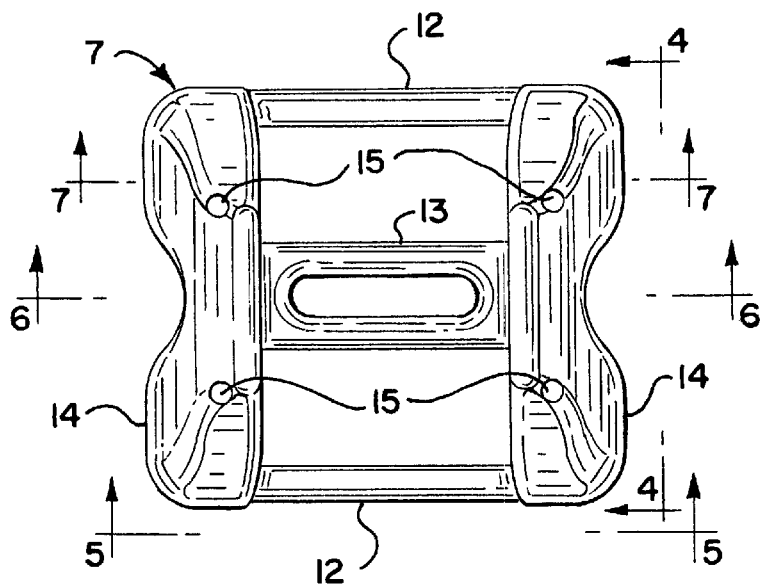
FIG. 3 is a top plan view of the bottom axle housing wrap of FIGS. 1 and 2.
Figure 4:
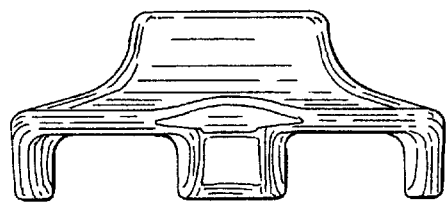
FIG. 4 is a side elevational view taken on line 4—4 of FIG. 3.
Figure 5:
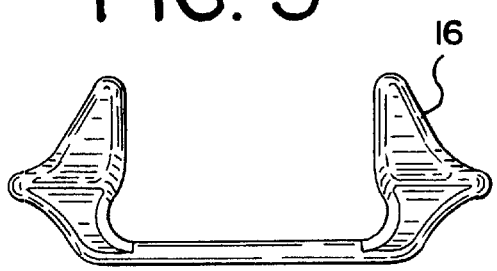
FIG. 5 is a side elevational view taken on line 5—5 of FIG. 3.
Figure 6:
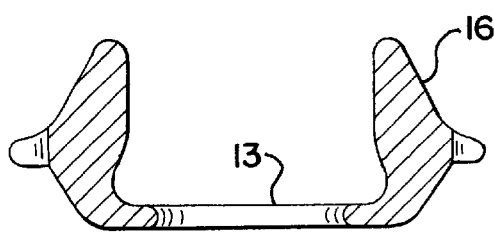
FIG. 6 is a sectional view taken on line 6—6 of FIG. 3.
Figure 7:
FIG. 7 is a sectional view taken on line 7—7 of FIG. 3.

Referring to FIGS. 1 and 2, a fabricated axle housing is indicated generally at 5 which is the axle housing for the front axle of a truck but which is representative of any axle housing, front or rear, of a truck. The system for clamping the axle housing 5 to a combination suspension support member and leaf spring indicated generally at 6 comprises a bottom axle housing wrap indicated generally at 7, a top axle housing wrap indicated generally at 8, a top clamping plate or top spring pad indicated generally at 10 and four clamping bolts indicated generally at 11—11. The spring 6 may correspond to the tapered convolute leaf spring shown and described in U.S. Pat. No. 5,938,221 the disclosure of which is incorporated by reference herein.

The bottom axle housing wrap 11 is shown in greater detail in FIGS. 3–10 to which reference is now made. The bottom axle wrap 11 may be either a casting or a forging with relatively wide openings in the interest of weight and cost reduction. It has two narrow side members 12—12 and a wider central member 13. The opposite ends of the members 12 and 13 are turned up and integrally joined by end cross members 14—14 in each of which two bolt holes 15—15 for the bolts 11 are located. Integrally formed on each of the end cross members 14 is an upwardly extending side or extension 16.

The bottom axle housing wrap 11 is designed to telescopically mate with a top axle housing wrap 8 (FIG. 11) in the manner shown in FIG. 10. The top axle wrap 8 has a width approximately equal to the distance between each pair of bolts 11 and the width of the combination suspension member and spring 6 so as to permit the assembly shown in FIG. 1. The top axle housing 8 has a pair of downwardly extending side members 17 which fit over the opposite sides of the axle housing 5 and between the upward extensions 16 on the bottom axle housing wrap 7 as shown in FIG. 10. As will be seen from FIG. 10 the bolts 11 are spaced an appreciable distance from the downwardly extending sides 17 of the top axle housing wrap 8 as well as from the opposite sides of the bottom wall 18 of the axle housing 5. As a result of this spacing, when the bolts 11 are tightened and placed under tension the opposite bottom edges of the axle housing 5 will act as fulcrums and allow the extensions 16 on the bottom axle housing wrap 7 to be tilted inwardly a small but appreciable amount against the downwardly extending sides 17 on the top axle wrap 8. This in turn will cause the downward extensions 17 to press against the opposite sides 20—20 of the axle housing 5. The result will be in the assembly shown in FIG. 1 that compressive forces will be uniformly applied to all four sides of the axle housing 5 whereby the tendency of the axle housing 5 to deform or collapse will be substantially eliminated.

If desired, the bottom and top axle housing wraps may be provided with liners (not shown) which act to improve the security of the clamped assembly.

What is claimed is:

1. In an axle suspension, duplicated on each side of a vehicle and having at least one axle and including a combination support member and spring, a system for clamping said axle adjacent one end of said combination support member and spring comprising,
    a bottom axle wrap on which the bottom side of said axle is seated,
    a top axle seated on the top side of said axle and engaging the underside of said combination support member and spring,
    a clamping plate seated on the top of said combination support member and spring and having at least one bolt hole extending through it,
    a plurality of bolts clamping together an assembly comprising in upward vertical orientation, said bottom axle wrap, said axle, said top axle wrap, said combination support member and spring and said clamping plate,
    at least one of said plurality of bolts being secured to said clamping plate and extending into said at least one bolt hole of said clamping plate, and
    said bottom axle wrap having upwardly extending sides which act against opposite sides of said axle, and said bolts extending between said bottom axle wrap and said clamping plate and spaced outwardly of said axle whereby tensioning of said bolts applies compressive forces against all four sides of said axle.

2. In an axle suspension, duplicated on each side of a vehicle and having at least one axle and including a combination support member and spring, a system for clamping said axle adjacent one end of said combination support member and spring comprising,
    a bottom axle wrap on which the bottom side of said axle is seated,
    a top axle wrap seated on the top side of said axle and engaging the underside of said combination support member and spring,
    a clamping plate seated on the top of said combination support member and spring,
    a plurality of bolts clamping together an assembly comprising in upward vertical orientation, said bottom axle wrap, said axle, said top axle wrap, said combination support member and spring and said clamping plate,
    said bottom axle wrap having upwardly extending sides which act against opposite sides of said axle, and said bolts extending between said bottom axle wrap and said clamping plate and spaced outwardly of said axle whereby tensioning of said bolts applies compressive forces against all four sides of said axle, and
    said top axle wrap having downward extensions which embrace opposite sides of said axle and interfit between said axle and said upwardly extending sides on said bottom axle wrap.

3. In the system for clamping of claim 2 the tightening of said bolts causing said upwardly extending sides to tilt inwardly and cause said downward extensions to bear against opposite sides of the axle whereby said axle is embraced on all four sides, on the bottom by said bottom axle wrap, on the top by said top axle wrap, and opposite sides by said downward extensions and said upwardly extending sides.

4. In an axle suspension, duplicated on each side of a vehicle and having at least one axle and including a combination support member and spring, a system for clamping said axle adjacent one end of said combination support member and spring comprising,
    a first axle wrap positioned on one side of said axle,
    a second axle wrap positioned on another side of said axle located vertically opposite said one side of said axle, and said second axle wrap engaging the combination support member and spring on one side thereof,
    a clamping plate positioned on an opposite side of said combination support member and spring and having at least one bolt hole extending through it,
    a plurality of bolts clamping together an assembly comprising in vertical orientation, said first axle wrap, said axle, said second axle wrap, said combination support member and spring and said clamping plate,
    at least one of said plurality of bolts being secured to said clamping plate and extending into said at least one bolt hole of said clamping plate, and
    said first axle wrap having extending sides which act against longitudinally opposite sides of said axle, and said bolts extending between said first axle wrap and said clamping plate and spaced outwardly of said axle whereby tensioning of said bolts applies compressive forces against all four sides of said axle.

5. In an axle suspension, duplicated on each side of a vehicle and having at least one axle and including a combination support member and spring, a system for clamping said axle adjacent one end of said combination support member and spring comprising, a first axle wrap positioned on one side of said axle, a second axle wrap positioned on another side of said axle located vertically opposite said one side of said axle, and said second axle wrap engaging the combination support member and spring on one side thereof, a clamping plate positioned on an opposite side of said combination support member and spring, a plurality of bolts clamping together an assembly comprising in vertical orientation, in order, said first axle wrap, said axle, said second axle wrap, said combination support member and spring and said clamping plate, said first axle wrap having extending sides which act against longitudinally opposite sides of said axle, and said bolts extending between said first axle wrap and said clamping plate and spaced outwardly of said axle whereby tensioning of said bolts applies compressive forces against all four sides of said axle, and said second axle wrap having extensions which embrace said longitudinally opposite sides of said axle and interfit between said axle and said extending sides of said first axle wrap.

6. In the system for clamping of claim 5 the tightening of said bolts causing said extending sides of said first axle wrap to tilt inwardly and cause said extensions of said second axle wrap to bear against said longitudinally opposite sides of said axle whereby said axle is embraced on all four sides.

* * * * *